July 17, 1962
P. C. ANDREWS
3,044,796
ADJUSTABLE SLIDE ASSEMBLY FOR VEHICLE WHEEL LOAD BALANCE
Filed Dec. 16, 1959
2 Sheets-Sheet 1
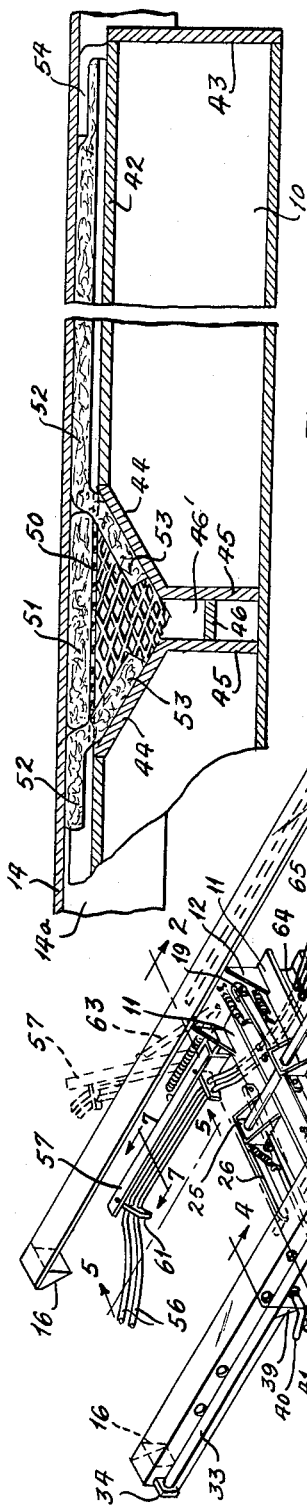
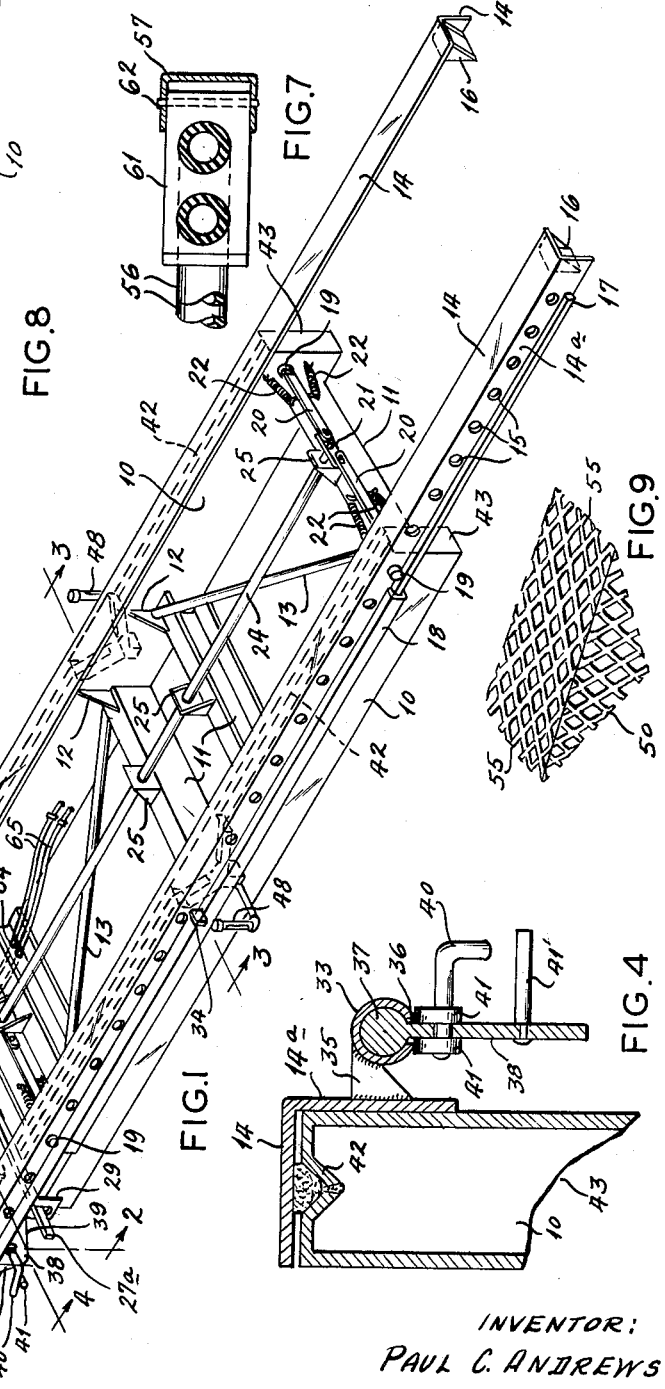
INVENTOR:
PAUL C. ANDREWS
BY Gravely, Lieder & Woodruff
ATTORNEYS.

July 17, 1962 P. C. ANDREWS 3,044,796
ADJUSTABLE SLIDE ASSEMBLY FOR VEHICLE WHEEL LOAD BALANCE
Filed Dec. 16, 1959 2 Sheets-Sheet 2
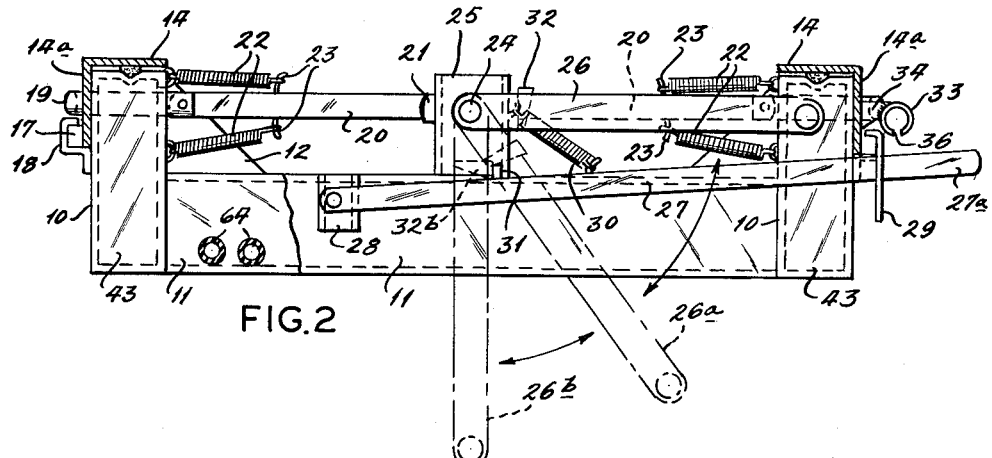
INVENTOR:
PAUL C. ANDREWS
BY Gravely, Lieder & Woodruff
ATTORNEYS.

United States Patent Office

3,044,796
Patented July 17, 1962

3,044,796
ADJUSTABLE SLIDE ASSEMBLY FOR VEHICLE
WHEEL LOAD BALANCE
Paul C. Andrews, 3959 Roland Blvd., Normandy, Mo.
Filed Dec. 16, 1959, Ser. No. 860,046
4 Claims. (Cl. 280—81)

This invention relates to improvements in adjustable slides for balancing the load on the wheels of trailer vehicles and the like.

It is an object of this invention to provide a strong and rugged slide assembly for trailer wheels which is simple in construction and positive in operation.

It is another object of this invention to provide an adjustable slide assembly of the character indicated with improved means for lubricating the same.

Another object of this invention is to construct a slide assembly in such manner that dirt and foreign matter is prevented from entering the slide ways, and a positive system of lubricating the slide ways is achieved.

A further object of this invention is to provide an adjustable slide assembly for trailers with improved means to select the position at which the wheels are to be locked relative to the trailer body.

A further object of this invention is to provide novel means in a trailer slide assembly for automatically taking up the slack in the brake hose lines so as to avoid fouling the lines during adjustment and to maintain the lines clear of the road.

Yet another object of this invention is to provide a novel system for supplying lubricant to the slide ways and for indicating the amount of lubricant available for this purpose.

Other objects and attendant advantages of this invention will be more particularly pointed out and described in connection with a presently preferred embodiment which has been illustrated in the accompanying drawings, wherein:

FIG. 1 is a perspective view of part of a trailer wheel mounting in which the adjustable slide assembly has been shown to advantage, the trailer body and wheels being omitted to simplify the view;

FIG. 2 is an end elevational view, partly in section, of the assembly as seen at line 2—2 in FIG. 1, but with a part also broken away to disclose hose line connector nipples;

FIG. 3 is a transverse sectional view taken at line 3—3 in FIG. 1;

FIG. 4 is a fragmentary sectional view on an enlarged scale taken at line 4—4 in FIG. 1;

FIG. 5 is a fragmentary longitudinal sectional elevational view taken at line 5—5 in FIG. 1;

FIG. 6 is a top plan view of the mechanism seen in FIG. 5;

FIG. 7 is a fragmentary sectional elevational view taken at line 7—7 in FIG. 1;

FIG. 8 is an enlarged fragmentary sectional elevational view of the principal structure of the assembly, the view being taken at line 8—8 in FIG. 3; and FIG. 9 is a perspective view of a lubricant wick retainer for the reservoir shown in FIG. 8.

In FIGS. 1 to 4 and 8, the slide assembly consists of the wheel carriage having a pair of box beam members 10 framed together by channel-shaped cross members 11 and suitable gussets 12. Diagonal braces 13 assist in maintaining the carriage frame in proper alignment. The carriage is mounted on road wheels in any suitable manner, but such details are not believed necessary to the invention and have been omitted. The carriage frame cooperates with the trailer body, also omitted for similar reasons, and slidably engages a pair of slide ways in the form of angle members 14 in which the vertical legs 14a lie against the outside surfaces of the box beam members 10 (FIG. 2) and are formed with a plurality of apertures 15. The angle members 14 are secured in any suitable manner to the trailer body and have stops 16 fixed at each end. Also, each vertical leg 14a of the angle members 14 carries a bar 17 extending lengthwise thereof, and each box beam member 10 carries a bar keeper 18 (FIGS. 1 and 3), the purpose of which is to retain the carriage in the trailer body slide ways 14. The carriage is assembled on the bars 17 by moving it to the forward ends (upper left in FIG. 1) of the slide ways 14 and dropping the ways over the beam members before reversing the movement to insert the bars 17 in the respective keepers 18. Thus, should any failure of the locking means occur, the carriage would move against the rear end stops 16 (lower right of FIG. 1) and prevent the separation of the carriage.

Turning to FIGS. 1, 2 and 3, the carriage is adjustable locked in the body ways 14 by a spring loaded system of locking pins 19 which pass through suitable guide bores in the beam members 10, the bores being in the line of the apertures 15 formed in ways 14. Each pin 19 is connected to an actuating link 20 and the links are paired up and connected to a crank arm 21. A pair of springs 22 is associated with each pin 19 by being anchored on the inner wall of the beam members 10 and attached to hooks 23 on the links 20. The springs 22 act to pull the links 20 outwardly so that the links and the crank arm 21 assume a substantially straight line position for self locking action against any force applied to the outer ends of the pins 19. In the view of FIG. 1, there are a pair of cooperating pins 19 at the forward and rearward ends of the carriage. An actuating torque rod 24, bearinged in suitable brackets 25, extends longitudinally of the carriage and the crank arms 21 are fixed to the rod. The forward end of rod 24 carries a pin retracting crank 26 (FIG. 2) shown in released position in full line, and in various positions of pin operation in phantom outline at 26a and 26b, position 26b corresponding to full retraction of pins 19 from the apertures 15 in the slide ways 14.

In FIGS. 1 and 2, the crank 26 is shown in association with a release lever 27 pivoted in a bracket 28 carried by the most forward cross brace 11. The lever is movable in a slotted guide plate 29 fixed on one of the box beam members 10, and a lift spring 30 is connected to the lever 27 and the adjacent endmost torque rod bracket 25 to urge the lever upwardly in the guide plate 29. A detent 31 on the lever 27 is located to engage a cooperating detent 32 on the crank 26, so that when the crank is moved to position 26b (FIG. 2) the detent 32 moves to position 32b and engages the detent 31. In attaining this position the lever 27 will have been pivoted downwardly to allow the detents 31 and 32 to pass each other and again raised by spring 30 to the full line position shown. At this time the locking pins 19 are disengaged by being withdrawn from the apertures 15 and the carriage and body may be moved relatively, as desired to balance the wheel load. It is understood that either detent 31 or 32 may be a notch or other formation as desired.

The means to release the pins 19 for again locking the carriage comprises a tubular rail 33 (FIGS. 1, 2 and 4) carried on one of the slide ways 14 by end brackets 34 and intermediate braces 35. The rail is formed with a longitudinal slot 36 opening downwardly, and a slide element 37 is mounted in the rail with a cam element 38 projecting from the slide element through the slot. The cam has two similar cam edges 39 so that it may be effective in either direction of adjustment of the carriage relative to the slide ways. The cam element is provided with a locking handle 40 rotatably carried therein and eccentric means 41 thereon may be rotated into forced engagement with the surfaces of the rail 33 at each side of the slot 36 to secure the cam element in any desired position. When the handle 40 is in released position (FIG. 1) it is rested on a pin 41', also carried by the cam element, so that it will not interfere with part of the oiling means later to be described. The cam element 38 is adapted to be moved along the rail 33 to a pre-selected position adjacent any selected aperture 15 of the adjacent slide way member 14, and locked in such position by rotating the handle 40 clockwise from the position of FIG. 1 to the position of FIG. 4. Thereafter one of the cam surfaces 39 will become effective to force the projecting end 27a of the lever 27 downwardly to break the engagement between detents 31 and 32 (previously described) thereby releasing crank 26 so that the springs 22 can drive the pins 19 into the apertures 15 of the slide way members 14.

It should now be understood in what manner the locking and slide adjustment selector means will operate. The advantages of the system are now obvious, and the self cleaning arrangement of the downwardly opening selector cam rail 33 is brought out.

The improved lubricating means for the adjustable slide assembly will now be described, reference being directed to FIGS. 1–4, 8 and 9. The box beam members 10 of the movable carriage assembly are each formed with a longitudinal channel 42 in the upper wall, such channels extending inwardly from the opposite end closure plates 43 of the beam members 10 to a central zone in which a lubricant reservoir has been provided. The reservoir of FIG. 8 is typical, and includes a pair of sloping walls 44 and a pair of vertical walls 45 secured within and between the sides of the beam members 10. A horizontal wall 46 cooperates with the vertical walls 45 to form a sump space 46' and a filler tube 47 (FIGS. 1 and 3) is open to the sump space and extend outwardly to support a gauge glass tube 48 and a closure cap 49. Since the handle 40 of the selector cam element 38 rests on the pin 41 in its released position it cannot strike the filler tube 47 and cause damage. The sump space 46' opens to a lubricant reservoir space formed by the sloping walls 44, and the reservoir space is covered by a wick retainer and screen 50 of the character shown in FIG. 9. The screen supports a splash pad 51 on its upper horizontal surface, such pad being absorbent to retain the lubricant and provide an oiling surface at the under side of the horizontal leg of the trailer body member 14. The reservoir space is open to the longitudinal channels 42 at each side (FIG. 8) and an oiling wick strip 52 is laid in the channels with the adjacent ends 53 lying on the sloping walls 44 to dip into the reservoir and transmit the lubricant along the length of the beam members 10. Each wick has its outermost end retained by a suitable clip 54 against being displaced during service. The wick retainer screen 50 is adapted to engage the wick ends 53 and retain them in the reservoir, and for this purpose each screen 50 may be formed of expanded metal material to provide sharp endings or rough edges 55 which grip the wick material without pinching so as to avoid reducing the wicking action thereof.

While the road wheel assembly has been omitted, it is understood that the wheel brakes must be actuated by the driver of the tractor unit of the vehicle. Therefore, it is usual to run the brake hose lines 56 under the trailer body and connect them to the wheel brake units. Heretofore, the brake hose lines have usually been strung along any convenient part of the trailer structure and have, at times, hung down in slack loops where road obstructions can engage the same, or where the hoses can get in the way of servicing the wheel assembly. The present assembly avoids the foregoing difficulty by automatically taking up hose slack as the carriage is adjusted in the slide way members 14.

As shown in FIGS. 1, 5, 6 and 7, the front end of the carriage (upper left in FIG. 1) is provided with a slack take-up arm 57 of channel-shape having one end pivotally mounted in a suitable bracket 58 carried by the nearest end plate 43 of the wheel carriage beam member 10. A pivot pin 59 engages in the bracket 58 and in a complementary member 60 on the arm. The arm is provided with a pair of spaced hose guide elements 61, each being pivotally mounted in the channel space on pins 62 (FIG. 7). The automatic hose slack take-up action of the arm 57 is obtained by attaching a tension spring 63 to the outer face of the arm and to the adjacent beam member 10, as shown in FIGS. 1 and 6. The spring 63 maintains a pull on the arm 57 to cause it to swing outwardly (as in the direction of arrow A in FIG. 6) and take-up hose slack as the slide assembly is adjusted to a wheels forward position, and to pay-out slack for wheels rearward adjustment. During such takeup or reverse action the guides 61 for the hoses will pivot so that no sharp bends are encountered. In FIG. 1, the hoses 56 extend in and under the forwardmost cross brace 11 and connect to threaded nipples 64, the nipples being fixed in the web portion of the next adjacent cross brace 11, as shown in FIGS. 1 and 2. Other brake lines 65 are then connected to the nipples 64 and extend to the various units of the wheel brake system (not shown). This last feature is advantageous as it allows a complete adjustable slide assembly to be shipped without danger of damage to the brake hose lines, and the lines are secure and protected while in service.

The foregoing description has related to a preferred embodiment of the invention and has provided a detailed disclosure of the several parts, components and assemblies which comprise the inventive characteristics. It is to be understood that changes and modifications may be made in some, any or all of the parts hereof, but all such changes and modifications are intended to be included, so as far as possible, within the scope of the appended claims.

What is claimed is:

1. In a vehicle wheel load adjusting slide assembly, a body having spaced angle members forming slide-ways, a wheel carriage frame having spaced beam members relatively slidable in said slide-ways, and means extending in the direction of sliding movement of the members for lubricating the relatively slidable surfaces of said members comprising lubricant supplies in certain of said members and lubricant distributing wicking means extending from said supplies lengthwise between said relatively slidable members for substantially the full length of the sliding surface of said members.

2. In a vehicle wheel load adjusting slide assembly, a body slide-way including spaced angle members, a wheel carriage frame including spaced beam members slidably engaged with said angle members, each beam member having a box section with a channel formed in an upper wall, a lubricant reservoir in said box section defined partly by sloping walls, a wick in said channel with an end lying on a sloping wall and the other end remote from said reservoir, and a wick retainer and reservoir cover set in said reservoir, said retainer having a wick element thereon adjacent said first mentioned wick.

3. In a vehicle wheel load adjusting slide assembly, a wheel carriage including spaced beam members each having an upper wall formed with a longitudinal channel, lubricant reservoir means in each beam member intermediate its ends, lubricant distribution wicking in each channel extending into said reservoir means, a pair of vehicle body slide ways spaced apart and slidably engaged with said beam members, each slide way having a first surface mounted upon the adjacent upper wall of said beam members and covering the channel and wicking therein, and each slide way having a second surface at an angle to the first surface and disposed adjacent a side of the adjacent beam member, means on each of said second surfaces and the adjacent beam members to retain said wheel carriage and vehicle body slide ways in sliding cooperation, and other means to lock said wheel carriage and vehicle body slide ways in wheel load adjusted position including a series of spaced apertures in each of said second surfaces and locking pins retractibly operably mounted on said wheel carriage, said locking pins engaging selected ones of said apertures to retain said slide ways in the adjusted position.

4. In a vehicle wheel load adjusting assembly the combination of: a wheel carriage having spaced beams, each beam having a box-like section to enclose an interior space; a body having spaced slides engaged upon said beams and slidably movable therealong; locking pins mounted on said beams and movable through said interior space, each locking pin having an end portion projectable from a beam into engagement with an adjacent body slide; and means in the vehicle normally exposed to road dirt and the like to control said locking pins to lock and release said body slides relative to said spaced beams, said means including an elongated hollow guide member having an elongated slot opening in a direction such that foreign matter from the road will not become caught in said hollow guide, a non-rotatave slide member relatively freely movable in said elongated slot, and securing means on one of said members adapted to engage with the other member to hold said slide member in adjusted position.

References Cited in the file of this patent

UNITED STATES PATENTS

| | | |
|---|---|---|
| 509,864 | Booth | Dec. 5, 1893 |
| 1,440,747 | Rogatchoff | Jan. 2, 1923 |
| 1,746,040 | Jenne | Feb. 4, 1930 |
| 1,847,524 | Dezendorf | Mar. 1, 1932 |
| 1,936,379 | Child | Nov. 21, 1933 |
| 2,411,391 | Robaczynski | Nov. 19, 1946 |
| 2,626,552 | Oehler | Jan. 27, 1953 |
| 2,835,504 | Acker | May 20, 1958 |
| 2,841,411 | Sheppard et al. | July 1, 1958 |
| 2,900,194 | De Lay | Aug. 18, 1959 |
| 2,918,301 | McKay | Dec. 22, 1959 |
| 2,935,332 | De Lay | May 3, 1960 |